F. MOREL AND L. TULOUP.
FILTERING APPARATUS.
APPLICATION FILED NOV. 9, 1920.

1,431,411.

Patented Oct. 10, 1922.

Patented Oct. 10, 1922.

1,431,411

UNITED STATES PATENT OFFICE.

FÉLIX MOREL AND LOUIS TULOUP, OF PARIS, FRANCE.

FILTERING APPARATUS.

Application filed November 9, 1920. Serial No. 422,809.

*To all whom it may concern:*

Be it known that we, FÉLIX MOREL and LOUIS TULOUP, citizens of the Republic of France, both residing at 52 Rue Botzaris, Paris, Seine, France, have invented certain new and useful Improvements in Filtering Apparatus (for which we have filed application in France Nov. 21, 1919, Patent No. 506,461); and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to a filtering apparatus more particularly adapted to be placed between the fuel reservoir and the carbureter on automobiles, flying machines and the like.

This filter, which retains water and impurities in a most efficient manner, comprises a casing or receiver having a pipe at its upper end for admission of the fuel, an inverted bell being arranged below said pipe for causing the fuel to be thrown towards the walls of the receiver. The said bell, encloses the end of a fuel outlet pipe and contains a filter or multiple screens arranged substantially in the diametric plane of the bell and entirely surrounding the fuel outlet pipe so that the fuel is properly filtered before it can, by rising in the apparatus, penetrate into the interior of said outlet pipe through openings provided in the pipe between the filter and the bottom of the bell.

The fuel outlet pipe is of a sufficient height to allow the fuel to flow out or to be decanted, the impurities and the water remaining at the bottom of the receiver.

Further the apparatus is provided with an inclined partition forming a funnel around the fuel outlet pipe so as to prevent the greater part of the impurities and the water from rising with the fuel and coming into contact with the filter screens.

Finally the receiver has an inclined bottom having an emptying cock at the lowest point thereof.

To enable the invention to be fully understood it will now be described by reference to the accompanying drawing in which:—

The filtering apparatus comprises, a receiver or reservoir $a$ which may be of cylindrical or other desired shape, having a pipe $b$ at its upper end which may be connected to the fuel delivery pipe of the fuel tank.

A bell or mushroom head $e$ is arranged below the end $b'$ of the pipe $b$, made of stamped sheet metal for example, and is fixed or riveted to the end of the outlet pipe $c$. The tube $c$ is preferably arranged in the central axis of the receiver $a$ and is provided with openings $g$ for the passage of the fuel. Before reaching the openings $g$ the fuel is filtered by means of multiple screens $f$ surrounding the pipe $c$ and held in position by the circular edge of the bell $e$. The pipe $c$ may be connected to the carbureter by a pipe $d$.

Figure 1:
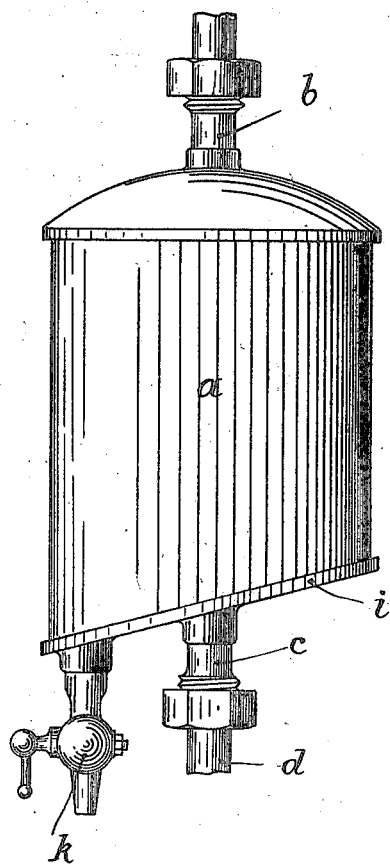
Fig. 1 is an outside view of a filtering apparatus constructed according to the invention and:—
Figure 2:
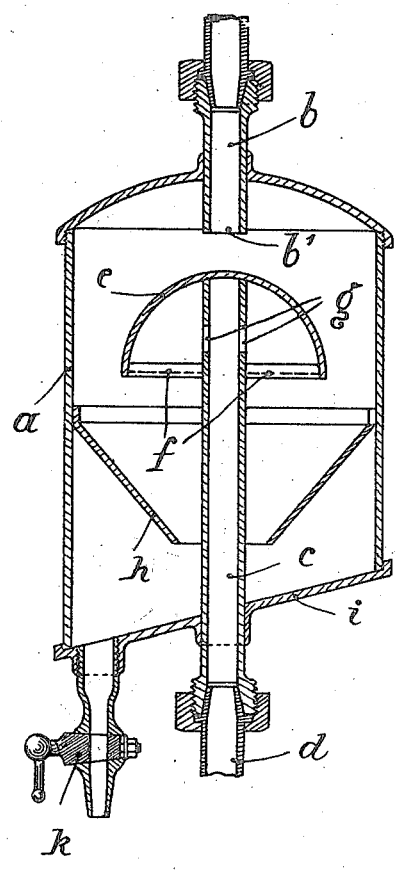
Fig. 2 is a vertical section thereof.

As shown in Fig. 2, a partition or funnel $h$ is fitted in the inside of the receiver $a$ to prevent the water and the impurities, which tend to rise with the flow of the fuel, from coming into contact with the filter $f$. The bottom $i$ of the receiver is preferably inclined and fitted with a cock $k$.

It will be understood that fuel, admitted through the pipe $b$ cannot enter directly into pipe $c$ because of the bell $e$ which causes the fuel to be driven radially towards the walls of the receiver $a$.

When the flow of the fuel rises up in the receiver, the fuel passes through the filter $f$, and reaches the openings $g$ in an absolutely pure or cleansed condition, and passes through said openings into the tube $c$ and so to the carbureter. It will be obvious that the invention is not limited to the particular construction described and shown herein and that various modifications may be made without departing from the spirit of the invention. For instance, the bell $e$ may be fixed to the inside wall of the receiver or to the cover and the outlet pipe $c$ may simply open into the interior of the bell at a certain distance from the bottom of the latter.

Having thus described the nature of the said invention and the best means we know of carrying the same into practicable effect we claim:—

1. A fuel filter for internal combustion engines comprising in combination, a closed reservoir, a fuel inlet pipe in the top thereof, a fuel outlet pipe in the bottom thereof, a cap on the outlet pipe, a filter screen on the underside of the cap surrounding the outlet pipe, a perforated portion of the outlet pipe extending between the filter screen and the top of the cap, and a funnel secured to the side of the reservoir below the cap and surrounding the outlet pipe but out of contact with same.

2. A fuel filter for internal combustion engines comprising in combination, a closed reservoir, a fuel inlet pipe in the top thereof, an inclined bottom, a fuel outlet pipe in the inclined bottom, an emptying cock on the lowest point of the inclined bottom, a cap on the outlet pipe, a filter screen on the underside of the cap surrounding the outlet pipe, a perforated portion of the outlet pipe extending between the filter screen and the top of the cap, and a funnel secured to the side of the reservoir below the cap and surrounding the outlet pipe but out of contact with same.

3. A fuel filter for internal combustion engines comprising in combination, a closed cylindrical reservoir, a fuel inlet pipe in the top thereof, an inclined bottom, a fuel outlet pipe in the inclined bottom, an emptying cock on the lowest point of the inclined bottom, a mushroom headed circular cap on the outlet pipe, a circular filter screen secured to the underside of the cap surrounding the outlet pipe, a perforated portion of the outlet pipe extending within the cap with the perforations between the top of the cap, and the filter screen and a funnel secured to the side of the reservoir below the cap and surrounding the outlet pipe but out of contact with same.

In testimony that we claim the foregoing as our invention, we have signed our names.

FÉLIX MOREL.
LOUIS TULOUP.